United States Patent [19]

Greene et al.

[11] Patent Number: 5,662,779
[45] Date of Patent: Sep. 2, 1997

[54] PORTABLE WATER PURIFICATION APPARATUS

[75] Inventors: Ralph G. Greene, Dalton, Ga.; David G. Palmer, Lincoln, Nebr.

[73] Assignee: Market Design & Development, Inc., Dalton, Ga.

[21] Appl. No.: 389,307

[22] Filed: Feb. 16, 1995

[51] Int. Cl.$^6$ .................. B01D 3/42; C02F 1/04
[52] U.S. Cl. .................. 202/181; 159/DIG. 4; 159/DIG. 42; 165/125; 165/163; 165/184; 202/83; 202/185.3; 202/185.4; 202/185.5; 202/189; 202/264; 202/269; 203/1; 203/10; 203/20; 203/100
[58] Field of Search .............. 203/20, 10, DIG. 16, 203/DIG. 18, 1, 4, 100; 202/181, 83, 185.3, 189, 185.4, 185.5, 193, 196, 264, 269; 222/67; 392/325; 159/DIG. 41, DIG. 4, DIG. 42; 165/125, 163, 184

[56] References Cited

U.S. PATENT DOCUMENTS

| | | | |
|---|---|---|---|
| 3,055,810 | 9/1962 | Skow | 203/10 |
| 3,563,861 | 2/1971 | Fletcher | 203/20 |
| 4,045,293 | 8/1977 | Cooksley | 202/181 |
| 4,612,090 | 9/1986 | Ellis, Jr. | 202/264 |
| 4,622,102 | 11/1986 | Diebel | 203/10 |
| 4,664,179 | 5/1987 | Yokoyama | 165/125 |
| 4,943,353 | 7/1990 | Shannon | 202/181 |
| 4,967,830 | 11/1990 | Eubank et al. | 165/125 |
| 4,985,122 | 1/1991 | Spencer | 202/181 |
| 5,110,419 | 5/1992 | Weber et al. | 202/185.3 |
| 5,156,706 | 10/1992 | Sephton | 202/264 |
| 5,178,734 | 1/1993 | Palmer | 203/10 |
| 5,281,309 | 1/1994 | Greene | 203/10 |
| 5,290,402 | 3/1994 | Tsai | 203/10 |
| 5,368,698 | 11/1994 | Field et al. | 202/181 |

FOREIGN PATENT DOCUMENTS

| | | | |
|---|---|---|---|
| 0653949 | 12/1962 | Canada | 203/20 |
| 0417456 | 10/1934 | United Kingdom | 165/125 |

*Primary Examiner*—Virginia Manoharan
*Attorney, Agent, or Firm*—Alan Ruderman

[57] ABSTRACT

A water purification apparatus positionable on an existing dispenser has a valve control member positionable in the water plenum of the dispenser to control release of purified water from the apparatus to the dispenser. A feedwater tank receives supply water which is fed to a water level control tank to maintain the water level in the boiler of the apparatus above the heating element. The control tank includes a partition separating a main reservoir from a de-foamer control chamber within which anti-foaming agent may be added. A condenser is coiled into a number of convolutions about a central opening and has external heat exchanger fins. An end cap assembly closes the central opening except for a small portion through which air is blown by a fan so that substantially all of the air flows over the fins. The boiler is a cylindrical container having a peripheral lip about an open end on which a lid having a steam outlet tube is positioned. The lid is secured in sealing relationship with the lip by a coil spring urged by a bar having clamps which grasp the peripheral lip.

17 Claims, 5 Drawing Sheets

PORTABLE WATER PURIFICATION APPARATUS

BACKGROUND OF THE INVENTION

This invention generally relates to a portable water purifier for purifying and storing drinking water, and more particularly to a purifier positionable on an existing conventional water cooling and dispensing unit.

Concern over drinking water purity and taste have prompted alternative sources of supply other than that supplied by processed tap water. This concern has been fueled by widely publicized reports of water pollution and by tap water often containing large amounts of water treatment chemicals, minerals and other matter.

One attempt to deal with this problem is the increased use of bottled waters. Sales of bottled waters which have increased substantially in recent years generally consists of a single serving to a one gallon container sold in retail establishments, and of larger containers, e.g., 5 gallon containers, sold for use with water cooler dispensers. Bottled cool water dispensers are extremely popular for both residential and commercial use because cold drinking water may be dispensed from generally a three to five gallon bottle without the need for plumbing. However, such bottled waters are expensive, and changing and storing large heavy and cumbersome bottles is burdensome.

Several problems with the quality of bottled waters also have been discovered and publicized in recent years. Bottled waters can readily become contaminated by airborne bacteria and viruses during the dispensing operation by the introduction of ambient air drawn inside the bottle as the water is dispensed. Further, the stagnant storage of bottled water allows bacteria to grow unchecked. Discoveries of dangerous chemicals and extremely high levels of bacteria in bottled waters has led many to the conclusion that bottled water may be no more pure, or sometimes even less pure, than ordinary tap water. Such problems with tap and bottled water have revealed a need and desire for water treatment at the point of use.

Several point of use treatment alternatives exist to tap and bottled water and are well known in the art. One such alternative is the use of carbon filtration which use activated charcoal to remove impurities, consisting mostly of organic compounds, and to improve the taste of water. Carbon filters, however, are generally ineffective in removing most inorganic compounds such as lead and arsenic.

Another alternative known in the art is the use of reverse osmosis to treat the water. Reverse osmosis units use a sediment prefilter. These units however, have a tendency to become clogged by high levels of hardness minerals and thus are not feasible for some geographic locations. Other problems with reverse osmosis include the waste of approximately 80% of the feedwater, the great expense of replacement membranes and the requirement of pressurized water feed lines and water drain lines which eliminates portability.

Another alternative point of use water treatment method is distillation. Distillation devices purify water by boiling water to generate steam, and then condense the steam to form water free from such contaminants. The contaminants having a vaporization temperature higher than that of water remain in the boiler, while solvents which have a boiling point lower than water may be separated from the steam by venting before condensation. The distillation process is more effective in removing impurities than reverse osmosis and does not have the problem of water waste.

Distillation devices may be portable, without the need for pressurized feed lines and drain lines or non-portable which require feed lines to supply water. Distillation alone, however, is relatively ineffective in removing volatile chemicals such as benzene and chlorine.

Existing portable distillers and most non-portable devices have failed to adequately deal with the problem of scale deposits in, and cleaning of, the boiler, as for example, the portable distillation device shown in U.S. Pat. No. 4,342,623 which has no provision to inhibit scale build-up. Other prior art portable distillation devices have a removable boiler, but require partial disassembly of the unit for removal of the boiler. Additionally, most of the known distillation units include a float valve within the boiler, such as U.S. Pat. No. 4,943,353 and is thus exposed to the build-up of scale. When excessive scale deposits occur failure of the float valve may result which may cause an overheating situation and a system failure. Other distillation units, such as in U.S. Pat. No. 5,178,734, may have an external solenoid valve controlled by level probes within the boiler. The probes are thus exposed to scale build-up.

Distillation units in the prior art are of the type wherein the water is distilled and captured for subsequent use, such as illustrated in U.S. Pat. No. 4,342,623; of the type wherein uncooled water may be dispensed as illustrated in U.S. Pat. No. 4,622,102; or of the type wherein the distillation unit is coupled with refrigeration such as illustrated in U.S. Pat. No. 3,055,810. As aforesaid, bottled water dispensers are extremely popular. It is thus advantageous to replace the water bottles of such containers with a less expensive and purer water source such as an efficient distillation unit.

In U.S. Pat. No. 5,281,309, assigned to the common assignee of the present invention, a water purification apparatus is disclosed which is mounted within a housing adapted to be positioned on a conventional water cooler/dispenser. The apparatus includes a valve control member which extends from the housing and is positionable within the water reservoir of the dispenser to control the release of purified water from the apparatus to the reservoir. To provide a compact housing for the water purification apparatus a boiler having a small cross section was provided in order to provide a high energy heating element in the boiler the length of the boiler was extended to prevent the water in the boiler from surging or flash vaporizing upwardly into the condenser coil, a condition known as "carry-over" the boiler disclosed in the aforesaid patent application was extended. Additionally, the level of the water within the boiler was controlled by the water level in the feedwater tank which is at an upper portion of the apparatus so that the height of the boiler had to be great enough to prevent water within the boiler from flowing or flashing into the condenser. In copending U.S. patent application No. 08/136,449 filed Oct. 14, 1983, also assigned to the common assignee of the present application, a baffle was placed above the heating element in the boiler to preclude carry-over, and a separate water level control tank was positioned between the feedwater tank and the boiler so the water level in the boiler could remain independent of the level of water in the feedwater tank.

A significant difficulty addressed by the present invention is the foaming that occurs with all known distillation apparatus incorporating high energy heating elements into small boilers. The foaming that occurs in water distillation apparatus creates the problem of contaminants being carried by the foam into the condenser unit coil and this results in contamination of the distilled water. Although anti-foaming agents are widely used in the food industry and are metered by elaborate metering pumps, such agents have not been used in compact distillation apparatus. One reason for this may be because heat from the boiler breaks down the foaming agent so the foaming agent has to be applied continuously in a very diluted form which would have required an elaborate diluting and metering system. Metering systems in this environment would be excessively expensive and not be cost effective. The present invention provides an effective and economical solution to this problem.

The steam which is formed in the boiler flows into a condenser where it is cooled and condensed into contaminant free water. The condenser generally is a helical coil having a number of convolutions and having external fins for providing a large heat transfer surface area for receiving heat from the coils by conduction. Cooling air is forced over the fins to receive energy from the fins by convection. In the prior art water purification apparatus the flow of cooling air has been through the center of the helical coil. The air thus contacts the portions of the fins bordering only along the central path. To increase the heat transfer efficiency, a globe or similar device has been mounted in the center of the coil to place frictional resistance in the central portions so that the air is directed between the exterior of the globe and the fins. However, even with this construction, only a small portion of the air flows across the entire surface of the fins. If the air could be directed entirely over the fins, the coil could be shortened substantially. The present invention addresses and provides a solution to this problem.

Another problem with the prior art to which the present invention is directed is the manner of securely mounting the boiler within the housing of the housing of the apparatus. Generally a connecting member such as a bolt or a rod extends through at least one end of the boiler to fasten the boiler to a portion of the housing. Not only does such a construction require a seal about the connecting member which functions properly at elevated temperatures, but also since a portion of the connecting member is within the boiler it is subjected to the corrosive action of the heated water and steam and to scale build-up. Under such circumstances, disassembly of the boiler when required may present difficulties.

SUMMARY OF THE INVENTION

Consequently, it is a primary object of the present invention to provide water purification apparatus which is compact yet efficient and highly effective, the apparatus being readily mounted on a water cooler dispensing unit for a point of use purification of drinking water.

It is another object of the present invention to provide water distillation and purification apparatus having an effective inexpensive means for metering and applying an anti-foaming agent to the water prior to entry of the water into the boiler so as to control or eliminate foaming within the boiler.

It is a further object of the present invention to provide water distillation and purification apparatus having a highly efficient compact condenser wherein the cooling air is directed so as to flow over substantially the entire surfaces of the fins of the condensing coil.

It is a still further object of the present invention to provide water distillation and purification apparatus having a boiler mounted in the housing of the apparatus without connecting means that penetrates the interior of the boiler so as to eliminate sealing and corrosion problems that would occur with such a construction.

Accordingly, the present invention provides a solution to the foaming problem that has plagued boilers of water distillation and purification apparatus of the prior art. In this regard, the present invention provides an inexpensive and effective metering system for feeding a diluted amount of anti-foaming agent to the boiler of water distillation and purification apparatus. A water level control tank, which controls the flow of water from the feedwater tank to the boiler to maintain the level of the water within the boiler substantially equal to that of the level control tank, includes a partition separating a main reservoir of the water level control tank from a de-foamer control chamber within which anti-foaming agent is added, the incoming water being directed into the de-foamer control chamber where it contacts the anti-foaming solution prior to entering the main reservoir of the level control tank. The water which exists the main reservoir of the level control tank and enters the boiler carries a diluted amount of anti-foaming agent into the boiler. Since anti-foaming agents have substantially zero solublity in water, have substantially lower density than water and thus float on water, and require very small amounts to prevent foaming, the water which flows into the de-foamer control chamber contacts the anti-foaming agent but does not become oversaturated with the agent. Thus, the anti-foaming agent is metered or administered in an effective manner and is not depleted rapidly.

Another aspect of the present invention provides water distillation and purification apparatus having a condenser coil having a number of convolutions about a central opening including external fins, cooling air being forced upwardly through the center of the coil and precluded from being exhausted above the coil so that all of the cooling air is directed to flow laterally over the fin, whereby the cooling capacity of the coil is substantially increased and the coil length substantially shortened. A fan is mounted below the coil to force the air upwardly, the size of the fan, and thus the noise created thereby, may be substantially reduced by the more efficient flow of air provided by the present invention. To preclude the air from exhausting above the coil, an end cap assembly is provided which closes the annulus or central opening within the coil except at the air inlet, and forces the air to take a path that results in the air flowing over the fins which thereby transfers the heat from the coil to the air in an efficient manner.

A further aspect of the present invention provides water distillation and purification apparatus having a boiler in the form of a cylindrical can having one end closed and having a peripheral lip disposed about an open opposite end, a lid being positioned on the open end and urged tightly into sealing relationship with the lip. The lid includes a steam outlet tube and a coil spring is disposed about the tube and forcibly urged against the lid by a bar which is connected to the lip by clamp members so that the bar is forced against insulation disposed on the lid and thereby forces the lid tightly against the periphery of the open end.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
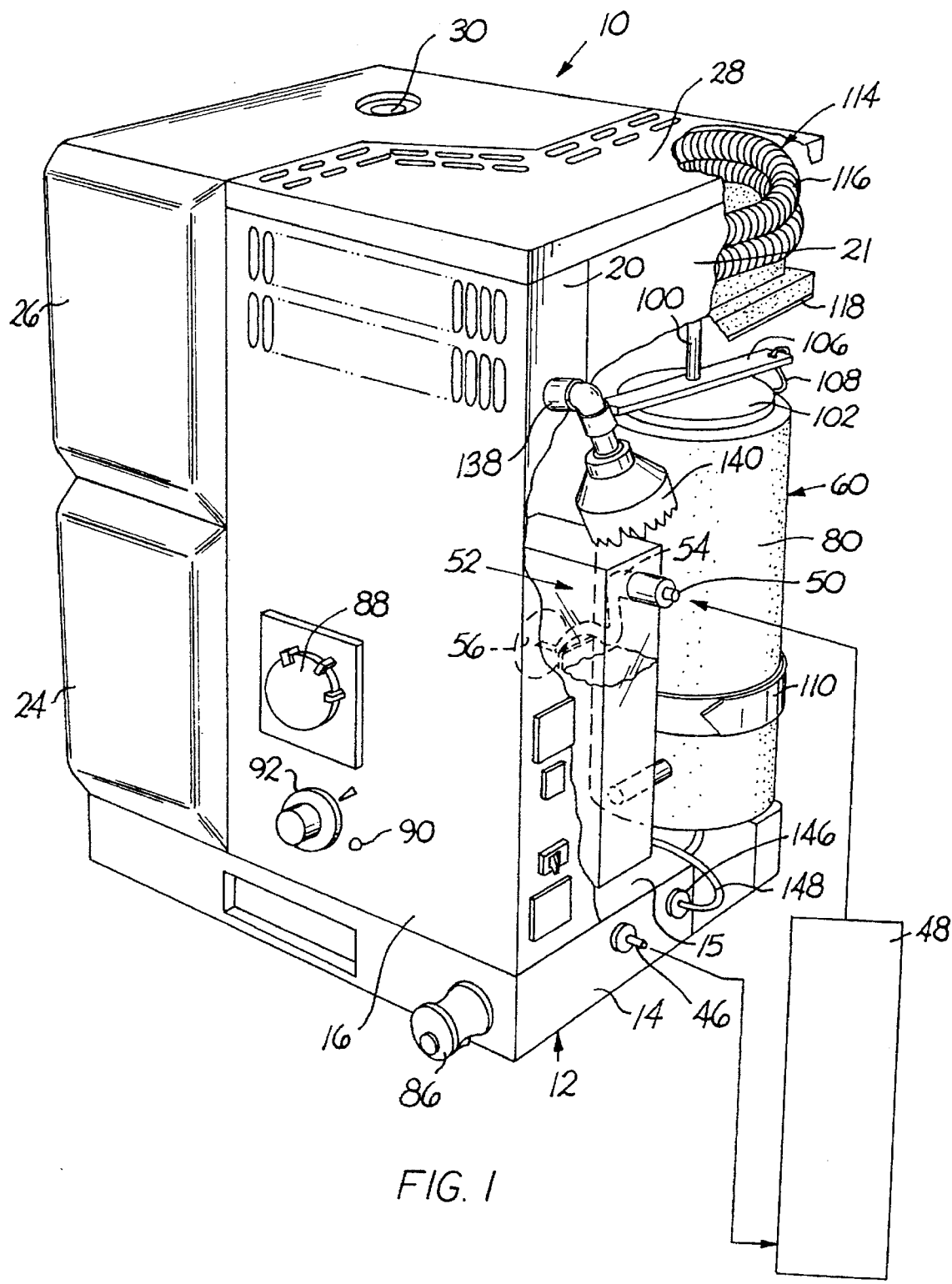
FIG. 1 is a front perspective view partly broken away of a water distillation and purification apparatus constructed in accordance with the present invention.

Referring to the drawings, a water distillation and purification device 10 constructed in accordance with the principles of the present invention comprises a housing having a substantially rectangular configuration including a base 14 having a floor 15, and a plurality of upstanding walls 16, 18, 20, 22 respectively forming a portion of the front and rear walls and the end walls of the housing. A panel 21 is connected to the lateral portions of the wall 20 for access into the housing. Mounted on the base 14 is a distillate or distilled water tank 24, the tank having a height approximately half that of the upstanding walls. A feedwater tank 26 is mounted on top of the distillate tank 24 and has its top substantially coplanar with a cover 28 fitted on the upper edges of the upstanding walls 16, 18, 20, 22. The tanks 24 and 26 preferably are formed from a transparent or translucent plastic material such as polyvinylchloride or polypropylene and have walls which abut the wall 22 while other walls are adjacent to the front and rear walls 16, 18 respectively. The feedwater tank 26 preferably has an opening 30 in its top, normally closed by a fill cap 31 so that the tank may be batch filled with water normally through the opening. Alternatively, the apparatus may be made automatic by connecting into plumbing at the location where used, the plumbing being connected to tubing extending through an opening 32 in the end wall 20 extending through the other end wall 22 and into the feedwater tank 26.

Mounted within the feedwater tank 26, at least for those units which are to be automatically filled, is a float 34, the float being part of a float valve assembly which includes an arm 36 extending from the float to a valve member 38 connected through tubing 40 extending out of the feedwater tank through the opening 32 for connecting to the plumbing. Thus, when the level of water within the tank 26 reaches a predetermined desired amount, the valve member 38 is actuated to shut the flow of water from the tubing 40 to the tank.

Figure 2:
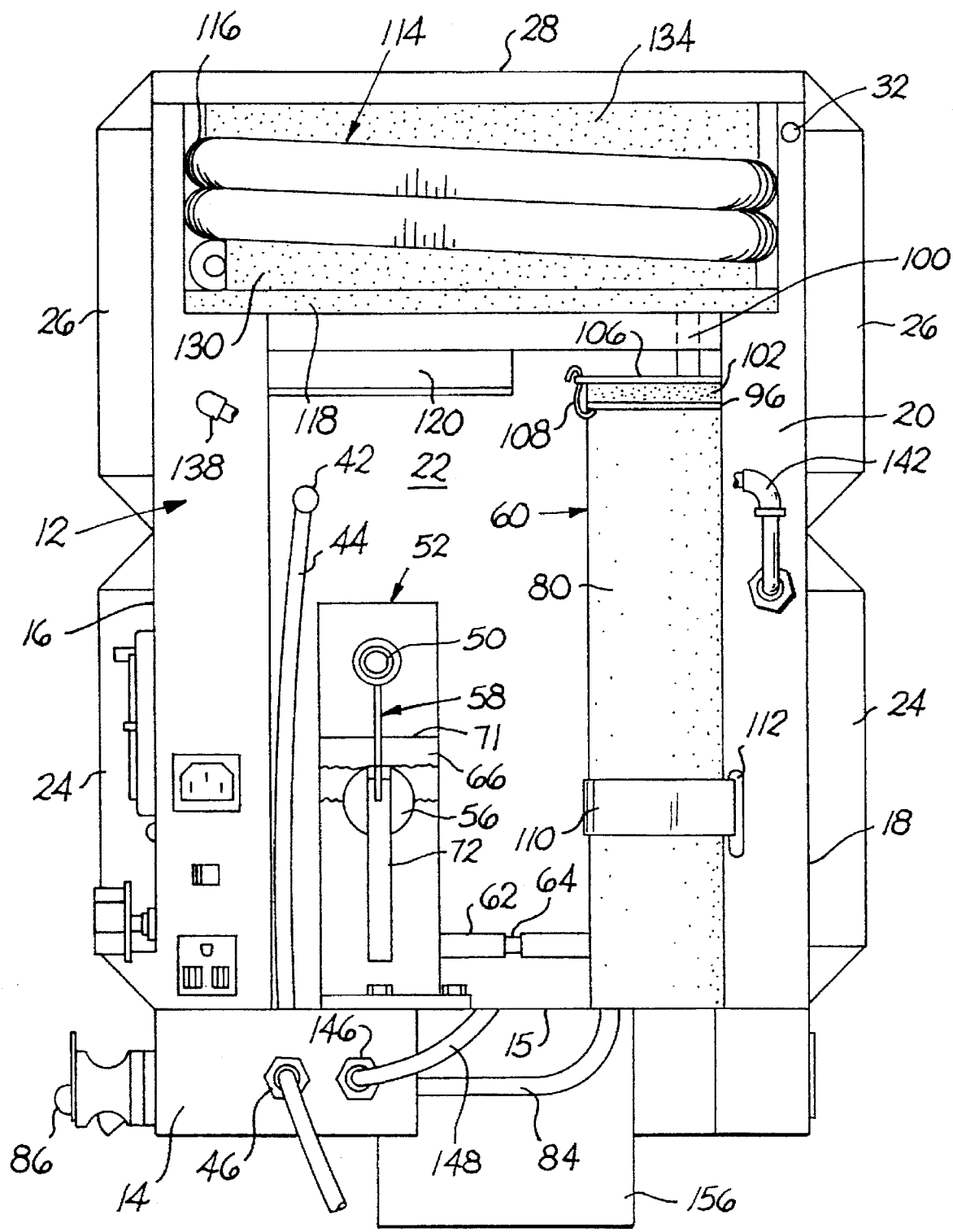
FIG. 2 is an end elevational view of the apparatus illustrated in FIG. 1 with the end panel removed.
Figure 4:
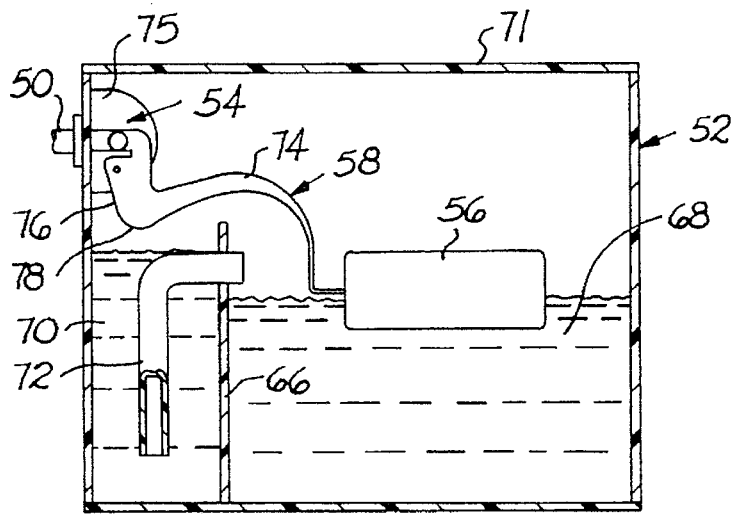
FIG. 4 is a diagrammatic view of the water level control tank and de-foamer chamber of the present invention.

As best illustrated in FIG. 2, the feedwater tank 26 communicates through an outlet fitting 42 adjacent the bottom thereof and extends through the wall 22 for connecting to one end of tubing 44, the other end of the tubing 44 being connected to an outlet fitting 46. Preferably a preconditioner filter 48, which softens the water, may have an inlet connected to the fitting 46 and has an outlet which is connected to an inlet fitting 50 of a small substantially rectangular shaped housing 52 which comprises a water level control tank, best illustrated in FIG. 4. The fitting 50 includes a valve member 54 controlled by a float 56 connected to the valve 54 by an arm or stem 58 so as to shut the flow of water from the feedwater tank 26 through the tube 44 when the water within the tank 52 is at a desired level. This water level is equivalent to the level of water in the boiler 60, the boiler being connected to the water level control tank by means of an outlet tube 62 extending between the control tank 52 and the boiler 60 as illustrated in FIG. 2. A flow restrictor 64 within the tube 62 provides resistance to prevent heated water from flowing back from the boiler to the level control tank. The water level control tank acts to control the level of water within the boiler. As long as the valve 54 is open, water flows from the feedwater tank 26 to the boiler 60 since the feedwater tank 26 is at a higher elevation than the boiler 60 and the water control tank 52.

In accordance with a first aspect of the present invention an anti-foaming agent, such as Dow Corning anti-foam "A" compound food grade silicon de-foamer, and similar products, is applied to the water prior to entry of the water into the boiler 60 in a manner that avoids heating and subsequent breakdown of the agent in the boiler by diluting the agent without requiring an expensive metering system. To this end, the water level control tank is partitioned by a wall 66 that divides the control tank into a main reservoir 68 and a de-foamer chamber 70, the wall 66 having an upper end that terminates below the top 71 of the tank 52 and of the stem 58 remote from the float 56. An upstanding tube 72 has one end disposed within the chamber 70 and another end which extends through the partition wall 66 at a location spaced above the water level maintained by the float 56 and valve 54. Additionally, the stem 58 of the float valve assembly, which preferably is a flat rod is twisted 90° so as to pivot at one end in the valve housing 75 and be readily bent at its other end for attachment to the float 56, has a configuration including an arcurately bent portion 74 so that it may project from the float 56 at one end below the wall 66 and extend over the wall 66 to the other end where it is pivoted in the valve housing 75 for opening and closing the valve 54, which is illustrated in the closed position in FIG. 4. Adjacent the valve 54 the stem 58 has a neck portion 76 extending downwardly toward the chamber so that water which enters through the inlet fitting 50 when the valve is open will contact the neck portion 76 and drop to the lowest point 78 below said neck into the chamber 70.

The top 71 of the tank 52 is open, at least above the de-foamer chamber 70, so that anti-foaming agent may be poured periodically into the chamber 70. The water drops from the valve 54 into the chamber 70, mixes with the anti-foaming agent, which is a gel lighter than the water, and the diluted mixture rises up through the tube 72 from the bottom of the chamber 70 into the level control reservoir 68 to thereafter flow through the outlet 62 to the boiler 60. Thus, the water entering the boiler has the anti-foaming agent diluted properly to approximately 1 to 5 parts per million for preventing foaming within the boiler without breaking down, the anti-foaming agent, of course, becoming more concentrated in the boiler as the water boils. Alternatively, anti-foaming agent may also be dispensed into the reservoir 68 by means of a porous wick that is disposed in the anti-foaming agent and absorbs the agent, the wick being positioned such that the incoming water directly contacts the wick to pick up the agent in sufficient amounts to control foaming.

Figure 3:
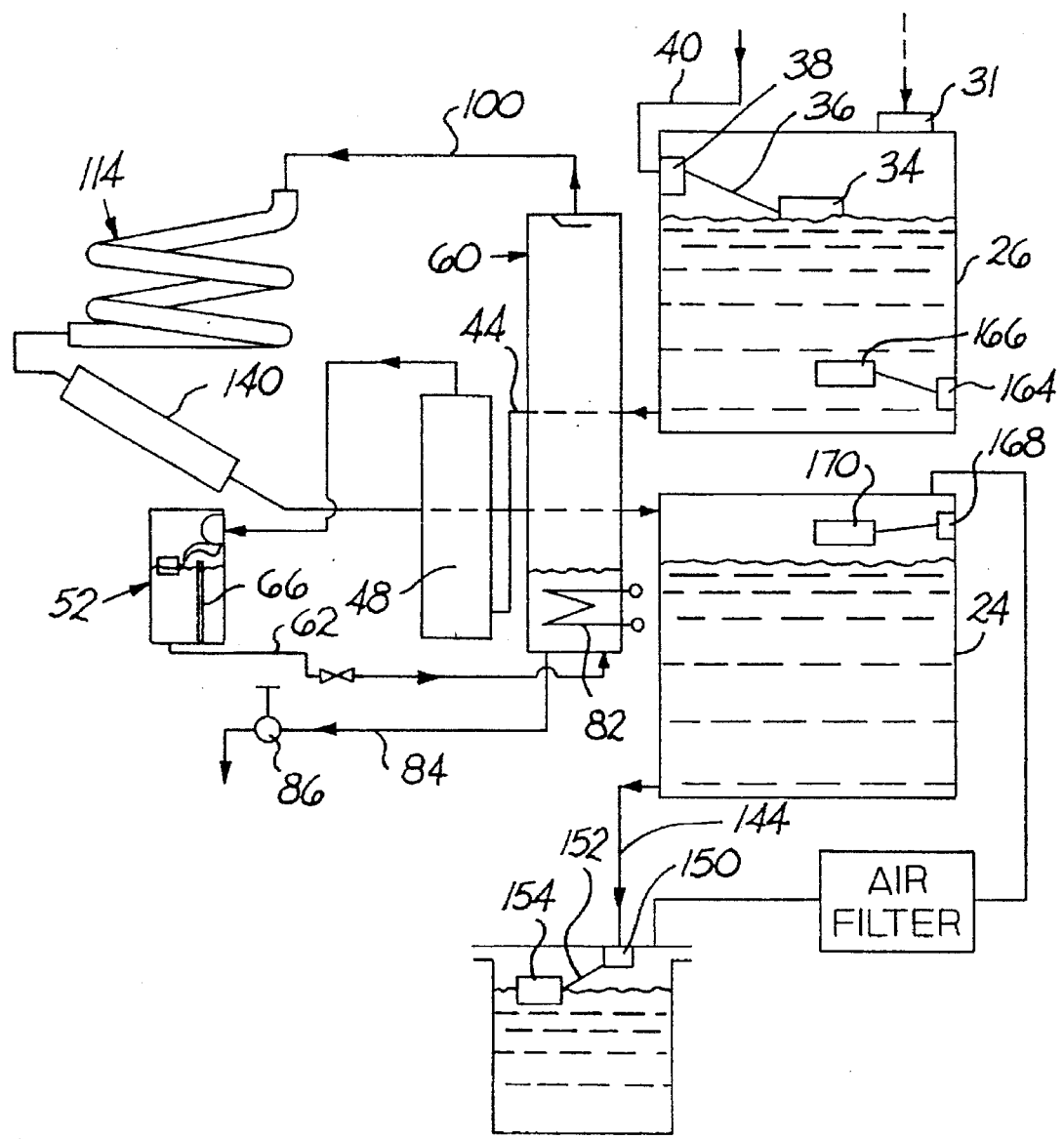
FIG. 3 is a diagrammatic view of the water distillation and purification apparatus of the present invention.

The boiler 60 is constructed from a non-corrosive material such as stainless steel in the form of a cylindrical can closed at the bottom and covered by insulation in the form of a hollow cylindrical sleeve 80. The length of the boiler is such that the upper end is below the feedwater tank 26 so that the housing 12 may be compact in size. As illustrated in FIG. 3, the water level within the boiler is controlled by the level of water within the reservoir of the water level control tank 52 since the boiler communicates with the control tank reservoir 68 through the tube 62 and the restrictor 64. Thus, when there is sufficient water in the feedwater tank 26, the level of water in the level control tank 52 and the boiler 60 is always above the top of the heating coil 82 in the boiler so that the boiler will not boil dry. This is assured by mounting the feedwater tank 26 at a higher level than the control tank 52 within the housing 12 and disposing the float 56 so that the water level within the control tank is above the heating element 82 while shutting off flow when the water in the boiler is a few inches above the heating element. The boiler is provided with a drain line 84 which connects to a manually operable valve member 86 at the front of the apparatus so that the boiler may be periodically drained to prevent excessive concentration levels of contaminants in the boiler. A drain timer 88 which activates a light 90 at the front of the apparatus alerts the user that the boiler should be drained, a reset dial 92 resetting the system.

Figure 6:
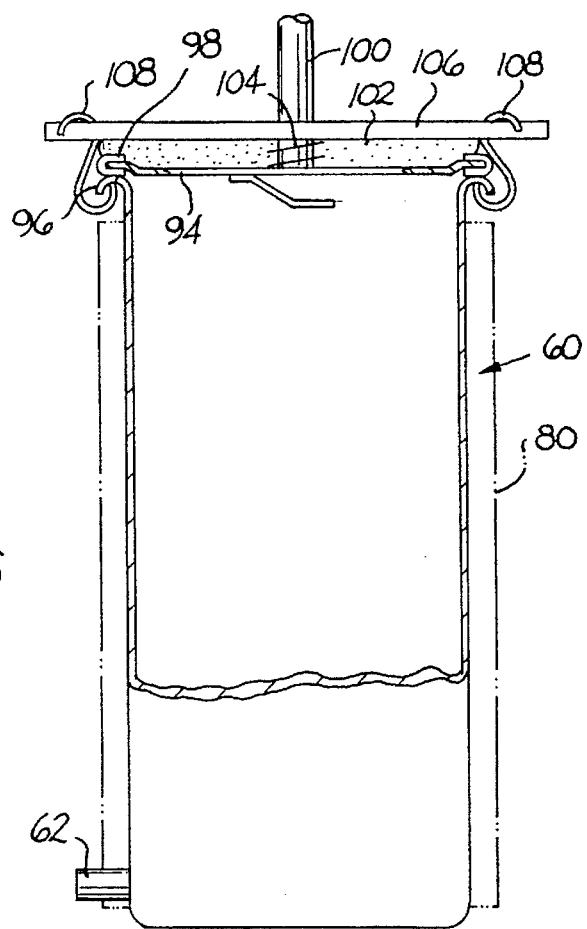
FIG. 6 is an elevational view partly in cross section and broken away of the boiler illustrated in FIG. 1.

The upper end of the boiler has a removable disk shape cap or lid 94 sealed to the boiler in a unique manner. To this end, the upper rim of the boiler has a outwardly disposed arcuately shaped lip 96 is formed, as illustrated in FIG. 6. An annular shaped silicone gasket 98 is positioned about the periphery of the cap or lid 94 and the assembly rests on the lip 96. The lid 94 has a central opening within which the outlet tube 100 of the boiler is received so that steam from the boiler may exhaust through the tube 100. Foam insulation 102 is disposed on the top of the lid 94 and has a central opening through which the tube 100 may pass, a coil spring 104 being disposed in the opening of the insulation about the tube 100. Positioned on the insulation is a bar 106 which rests on the upper surface of the spring 104, and a pair of S-shaped hook members 108 are received within apertures in the bar 106 to grasp the bar at one end and at the other ends are received at the underside of the lip 96 to draw the bar tightly against the spring 104 and urge the spring against the top of the lid 94 to firmly secure the lid in sealed relation with the top of the boiler. A strap 110 encircles the boiler and passes through an opening 112 in the wall 20 to tightly secure the boiler in place against the floor 15 to preclude movement of the boiler. With this construction, no connecting members entering the boiler are required so that sealing problems in regard to mounting of the boiler are precluded.

Figure 5:
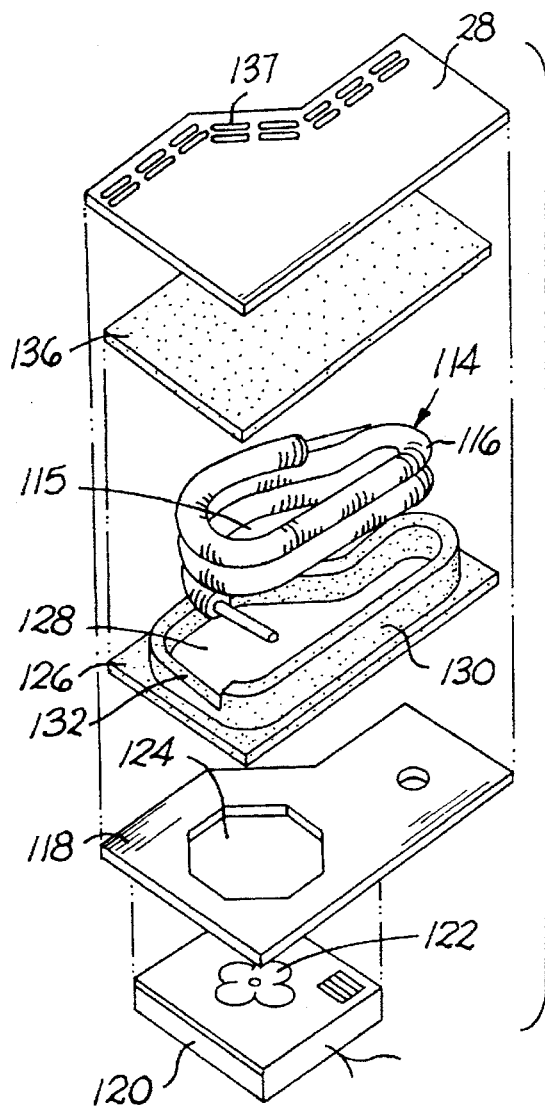
FIG. 5 is an exploded perspective view of the condenser portion of the apparatus illustrated in FIG. 1.

The boiler outlet tube 100 extends upwardly from the boiler and is connected to the inlet end of a condenser coil 114 coiled in a number of convolutions into a form similar to a helix but not in a circular form and having a central opening 115 as best illustrated in FIG. 5. As is conventional, the condenser coil 114 has a multiplicity of heat transfer fins 116 disposed about the entire exterior surface, the fins being spaced from the walls 16, 18, 90, 22. A floor 118 is fastened to the walls 16, 18, 20, 22 above the boiler and below the condenser 114. A fan housing 120 including a fan 122 is fastened to the lower face of the floor 118, the floor having an aperture 124 through which air may be supplied by the fan upwardly over the fins 116 of the condenser 114. Positioned on the upper surface of the floor 118 is a foam pad 126 having an opening 128 substantially in the shape of the condenser coils, and an integral upstanding wall 130 about the opening and of that same peripheral configuration. The wall 130 has an upper edge or surface 132 varying in elevation in accordance with the bottom-most convolution of the condenser coil so that the bottom-most coil may rest on the upper edge 132 of the wall 130 as best illustrated in FIGS. 2 and 5. Positioned on the upper convolution of the condenser coil 114 is the surface of a downwardly extending wall 134 similar to the wall 130, the wall 134 being formed on and extending downwardly from a foam ceiling 136 which is abutted by and held in place by the cover 28. The ceiling member 136 is closed in the central area above the opening 116 of the convolutions of the condenser coil 114.

Thus, the walls 132, 134 and the ceiling member 136 act as a seal to baffle all of the air from the fan about the fins 116 from the central opening 115 laterally outwardly toward the walls 16, 18, 20, 22, where the air exits through various openings in the housing including openings 137 in the cover 28. This produces great cooling capacity and permits the condenser coil length to be shortened substantially. Additionally, the size of the fan and the noise created by the fan may also be greatly reduced. As the steam flows through the coils, it is thereby cooled and condensed into distilled water.

The distilled water exiting from the condenser flows out of the apparatus through a conduit 138 into an external filter 140 and then back through tubing 142 through the wall 120 and into the. distillate water tank 24. The filter 140 preferably has a mixture of activated carbon, calcium and magnesium carbonate which slowly dissolve to improve the taste of the water and raise its pH value.

Figure 7:
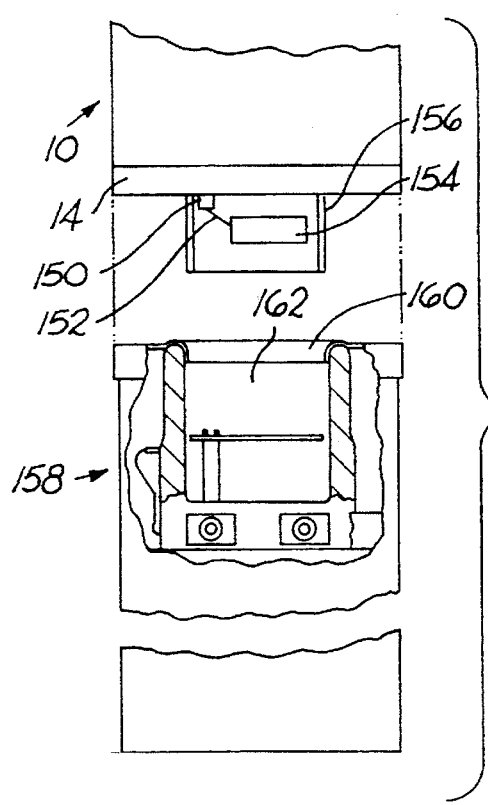
FIG. 7 is a fragmentary elevational view with parts thereof broken away and in section illustrating the mounting of the apparatus of FIG. 1 on a conventional water cooler and dispenser.

Connected to and communicating with the distillate tank 24 is tubing 144, illustrated diagrammatically in FIG. 3, which extends externally of the distillate tank and is connected to an outlet fitting 146 on the base 14. A tube 148 is connected to the fitting 146 at one end and at its other end is connected to a float control valve member 150. The valve member 150 is part of an assembly which includes an arm 152 connecting a float 154 to the valve member. When the float is raised to a predetermined position the valve is closed and the flow of water from the distillate tank 24 through the tubes 144 and 146 is shut. The valve 150, the arm 152 and the float 154 is positioned within a can or guard 156 which is removably connected to the floor 15 and extends downwardly from the apparatus below the base 14. Thus, as illustrated in FIG. 7, the water purification apparatus 10 may be positioned upon a conventional bottled water cooling and dispensing unit 158 when the water bottle is removed, and the guard 156 is received within the top cabinet ring 160 of the dispensing unit 158 with the float 154 disposed within the water plenum or reservoir 162 of the dispensing unit 158. The water level within the reservoir 162 of the cooler and dispensing unit 160 thus effects the operation of the valve 150 and the flow of water from the distillate tank 24 to the cooler and dispensing unit 158.

A low water switch 164 controlled by a float member 166 in the feedwater tank 26 may be included so as to protect the boiler from running out of water when the level of water within the tank 26 causes the float to activate the switch 164. Similarly, a high water switch 168 may be included in the distillate tank 24 controlled by a float 170 to shut the unit from operation when the distillate tank 24 is full.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Water purification apparatus comprising a feedwater tank for receiving water to be purified, an upstanding boiler having an electrical heating element disposed therein adjacent a lower end for boiling water, a water level control tank having a water reservoir communicating said feedwater tank to said boiler, means for mounting said feedwater tank relative to said water reservoir such that when water within said feedwater tank is above a preselected level there is water in said reservoir, valve control means in said control tank for controlling the level of water in said reservoir from exceeding a predetermined level, means for mounting said control tank at an elevation wherein said predetermined level is above said heating element, whereby said heating element is submerged in water in said boiler, a chamber associated with said level control tank for storage of an anti-foaming agent for limiting formation of foam in said boiler, means for dispensing a controlled amount of anti-foaming agent from said chamber to said reservoir, a condenser for receiving steam from said boiler and for condensing said steam to form distilled water, a distillate tank, means communicating said condenser with said distillate tank for supplying distilled water to said distillate tank, and means for dispensing water from distillate tank selectively.

2. Water purification apparatus as recited in claim 1, wherein said water level control tank includes a partition wall separating said reservoir from said chamber, means for directing water from said feedwater tank into said chamber for mixing with anti-foaming agent stored therein to provide a diluted mixture of anti-foaming agent, and conduit means for communicating said mixture from said chamber to said reservoir.

3. Water purification apparatus as recited in claim 2, wherein said conduit means comprises a tube extending from said chamber through said partition wall.

4. Water purification apparatus as recited in claim 2, wherein said control tank includes a water inlet adjacent said chamber, said valve control means including a float within said reservoir, a stem having one end connected to said float and a second end mounted for opening and closing said water inlet, said stem extending over said partition wall intermediate said one end and said second end, and means on said stem for directing water flowing from said water inlet into said chamber.

5. Water purification apparatus as recited in claim 4, wherein said conduit means comprises a tube extending from said chamber through said partition wall.

6. Water purification apparatus positionable upon an existing water dispenser having an open top water plenum, said apparatus comprising a housing including a base at the bottom of said housing, a feedwater tank for receiving water to be purified, an upstanding boiler having an electrical heating element disposed therein adjacent a lower end for boiling water, a water level control tank having a water reservoir communicating said feedwater tank to said boiler, means for mounting said feedwater tank relative to said water reservoir such that when water within said feedwater tank is above a preselected level there is water in said reservoir, valve control means in said control tank for controlling the level of water in said reservoir from exceeding a predetermined level, means for mounting said control tank at an elevation wherein said predetermined level is above said heating element, whereby said heating element is submerged in water in said boiler, a chamber associated with said level control tank for storage of an anti-foaming agent for limiting formation of foam in said boiler, means for dispensing a controlled amount of anti-foaming agent from said chamber to said reservoir, a condenser for receiving steam from said boiler and for condensing said steam to form distilled water, a distillate tank, means communicating said condenser with said distillate tank for supplying distilled water to said distillate tank, said distillate tank having a water outlet, a port opening downwardly through said base, means for communicating said outlet with said port, float valve means including a valve disposed for opening and closing communication between said port and said outlet, and said valve means including a float for controlling said valve disposed at an elevation below said base for receipt within said water plenum for opening and closing said valve in response to water within said plenum when said apparatus is positioned upon said dispenser.

7. Water purification apparatus as recited in claim 6, wherein said water level control tank includes a partition wall separating said reservoir from said chamber, means for directing water from said feedwater tank into said chamber for mixing with anti-foaming agent stored therein to provide a diluted mixture of anti-foaming agent, and conduit means for communicating said mixture from said chamber to said reservoir.

8. Water purification apparatus as recited in claim 7, wherein said conduit means comprises a tube extending from said chamber through said partition wall.

9. Water purification apparatus as recited in claim 7, wherein said control tank includes a water inlet adjacent said chamber, said valve control means including a float within said reservoir, a stem having one end connected to said float and a second end mounted for opening and closing said water inlet, said stem extending over said partition wall intermediate said one end and said second end, and means on said stem for directing water flowing from said water inlet into said chamber.

10. Water purification apparatus as recited in claim 9, wherein said conduit means comprises a tube extending from said chamber through said partition wall.

11. Water purification apparatus comprising a housing including a plurality of vertically extending walls, a feedwater tank for receiving water to be purified, a distillate tank for storing purified water to be dispensed selectively, an upstanding boiler having a heating element disposed therein for boiling water received from said feedwater tank, a condenser mounted above said boiler for receiving steam from said boiler and for condensing said steam to form distilled water, said condenser comprising a tube twisted about a central opening into a coil having a plurality of convolutions one above the other, a multiplicity of fins disposed about said tube spaced from said walls for providing a surface area substantially larger than that of the tube for transfer of heat from said tube, a fan mounted below said condenser for blowing cooling air upwardly into said opening, sealing means including wall members disposed in abutment with fins on uppermost and lowermost of said convolutions for substantially eliminating air flow upwardly out of said central opening and changing the direction of the path of the air to thereby force said cooling air to flow outwardly from said opening laterally over said fins toward said vertically extending walls and out said housing, and means communicating said condenser with said distillate tank for supplying distilled water to said distillate tank, said sealing means including a pad disposed above said condenser closing said central centric opening and wall members extending downwardly from said pad.

12. Water purification apparatus as recited in claim 11, wherein said sealing means further includes a plate disposed intermediate said boiler and said condenser having an aperture, said fan being fastened to said plate and supplying air through said aperture, and a lower pad mounted on said plate, said lower pad having upwardly extending wall members.

13. Water purification apparatus as recited in claim 11, wherein said boiler comprises a substantially cup-shaped cylindrical container having a closed bottom end and an open top including a peripheral lip, means for communicating said container with said feedwater tank, a disk-shaped lid positionable on said top, said lid having an outlet tube communicating said boiler with said condenser, a seal disposed about the periphery of said lid positioned on said lip, a spring positioned about said outlet tube and disposed in abutment with said lid, and securing means for forcibly urging said spring against said lid to forcibly engage said seal with said lip.

14. Water purification apparatus as recited in claim 13, wherein said securing means comprises a bar disposed above and in abutment with said spring, and means connected to said bar and to said lip for drawing said bar toward said lid for compressing said spring.

15. A water purification apparatus having a feedwater tank for receiving water to be purified, a boiler for receiving water from said feedwater tank, a condenser for receiving steam from said boiler and for condensing said steam to form distilled water, and a distillate tank for receiving distilled water from said condenser and storing said distilled water to be dispensed selectively, wherein said boiler comprises a substantially cup-shaped cylindrical container having a closed bottom end and an open top including a peripheral lip, means for communicating said container with said feedwater tank, a disk-shaped lid positionable on said top, said lid having an outlet tube communicating said boiler with said condenser, a seal disposed about the periphery of said lid positioned on said lip, a spring positioned about said outlet tube and disposed in abutment with said lid, and securing means for forcibly urging said spring against said lid to forcibly engage said seal with said lip.

16. Water purification apparatus as recited in claim 15, wherein said securing means comprises a bar disposed above and in abutment with said spring, and means connected to said bar and to said lip for drawing said bar toward said lid for compressing said spring.

17. Water purification apparatus comprising a housing including a plurality of vertically extending walls, a feedwater tank for receiving water to be purified, a distillate tank for storing purified water to be dispensed selectively, an upstanding boiler having a heating element disposed therein for boiling water received from said feedwater tank, a condenser mounted above said boiler for receiving steam from said boiler and for condensing said stem to form distilled water, said condenser comprising a tube twisted about a central opening into a coil having a plurality of convolutions one above the other, a multiplicity of fins disposed about said tube spaced from said walls for providing a surface area substantially larger than that of the tube for transfer of heat from said tube, a fan mounted below said condenser for blowing cooling air upwardly into said opening, sealing means including wall members disposed in abutment with fins on uppermost and lowermost of said convolutions for substantially eliminating air flow upwardly out of said central opening and changing the direction of the path of the air to thereby force said cooling air to flow outwardly from said opening laterally over said fins toward said vertically extending walls and out said housing, and means communicating said condenser with said distillate tank for supplying distilled water to said distillate tank, said sealing means including a plate disposed intermediate said boiler and said condenser having an aperture, said fan being fastened to said plate and supplying air through said aperture, and a pad mounted on said plate, said pad having upwardly extending wall members.

* * * * *